United States Patent [19]

Sakamoto et al.

[11] 4,232,344

[45] Nov. 4, 1980

[54] DEVICE FOR REPRODUCING A HALFTONE PICTURE BY SCANNING

[75] Inventors: Seiya Sakamoto, Kyoto; Tetsuo Hohki, Ibaragi; Isao Saito, Shiga, all of Japan

[73] Assignee: Dainippon Screen Seizo Kabushiki Kaisha, Kyoto, Japan

[21] Appl. No.: 964,189

[22] Filed: Nov. 28, 1978

[30] Foreign Application Priority Data

Dec. 6, 1977 [JP] Japan .............................. 52-145683

[51] Int. Cl.³ ........................................... H04N 1/22
[52] U.S. Cl. ................................ 358/298; 358/302
[58] Field of Search ............................. 358/298, 302; 179/100.31; 346/108

[56] References Cited

U.S. PATENT DOCUMENTS

| | | | |
|---|---|---|---|
| 2,818,465 | 12/1957 | Brink | 358/298 |
| 3,983,319 | 9/1976 | Moe | 358/298 |

FOREIGN PATENT DOCUMENTS 51-150401 12/1976 Japan ..................................... 358/298

*Primary Examiner*—Bernard Konick
*Assistant Examiner*—Alan Faber
*Attorney, Agent, or Firm*—Schwartz & Weinrieb

[57] ABSTRACT

A device for reproducing a halftone picture by scanning, representing a marked simplification over conventional devices of this type. The recording beam is controlled by two deflection means and an aperture of simple shape and the control means allows dot patterns with a screen angle to be produced very simply.

11 Claims, 14 Drawing Figures

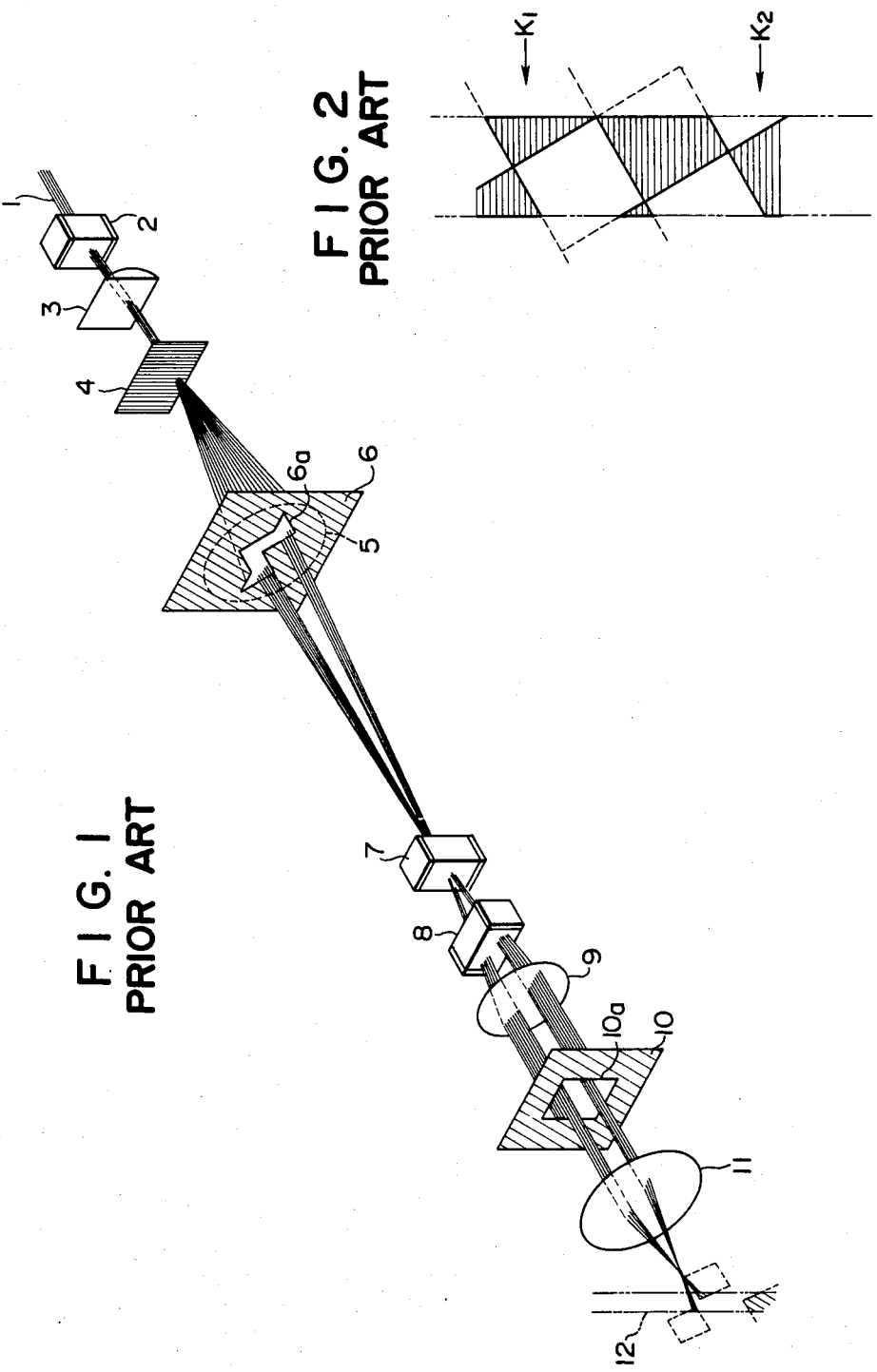

FIG. 11
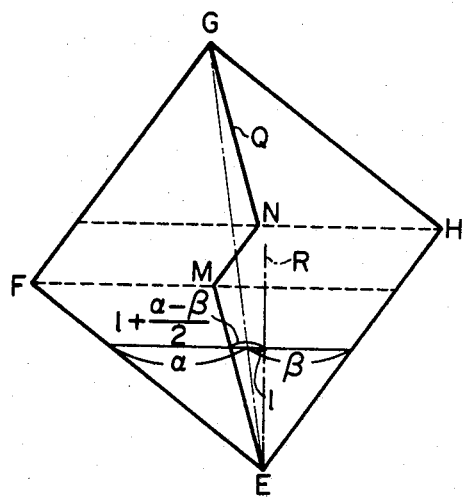
FIG. 12
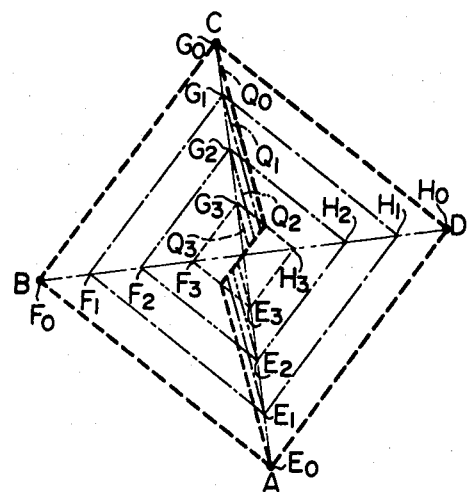
FIG. 14
(a)
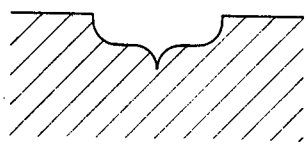
(b)
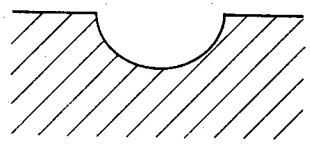
(c)
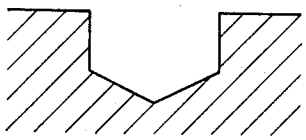
(d)
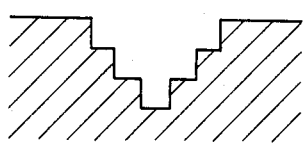

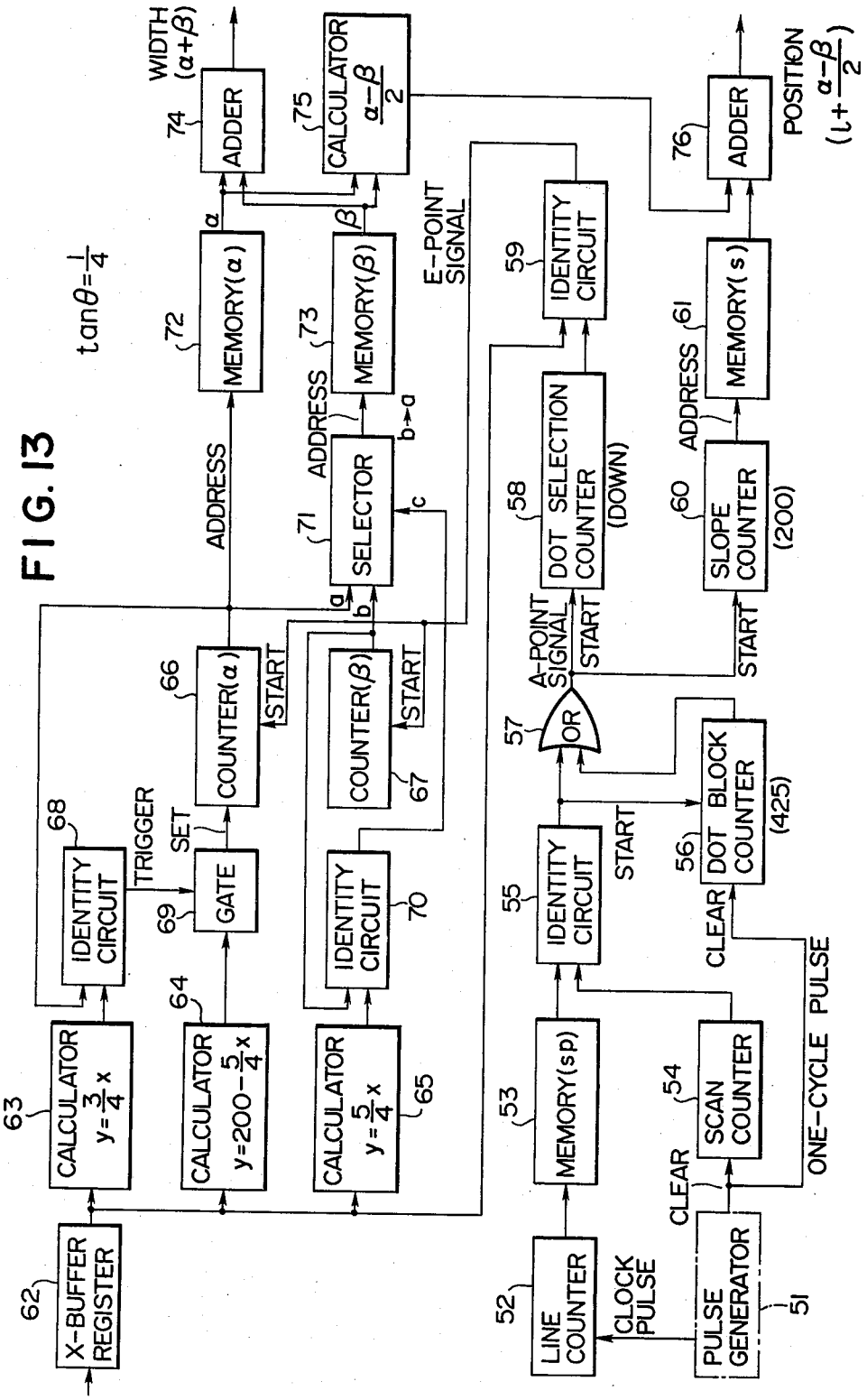

DEVICE FOR REPRODUCING A HALFTONE PICTURE BY SCANNING

BACKGROUND OF THE INVENTION

This invention relates to a device for reproducing a halftone picture by scanning.

There are already known many methods for recording a halftone picture by means of a scanning recorder such as a color scanner for plate-making according to picture signals picked up by scanning an original picture. For example, Japanese Patent Lying-Open Publications Nos. 51-88301 and 51-150401 (Japanese Patent Applications Nos. 50-11386 and 50-73082) entitled "A machine and method for reproducing a halftone picture by scanning" have been filed by the same applicant assignee as the present invention.

In the former publication the width of the light beam perpendicular to the scanning direction is varied periodically by an aperture plate according to the picture signals, thereby recording a line of halftone dots in the direction of the scanning line.

In the latter publication No. 51-150401 the center of the recording light beam is periodically shifted in the axial direction of the recording cylinder according to the picture signals so as to record a line of halftone dots with a screen angle.

In the latter application, as illustrated in FIG. 1, the elements which are suitably arranged along the optical axis of the light beam 1, which is generated by a laser, include a first vertical deflection element 2, a cylindrical lens 3, a lenticular lens 4, a relay lens 5, an aperture plate 6 having an aperture 6a, a second vertical deflection element 7, a horizontal deflection element 8, a first focusing lens 9, a masking means 10 having an aperture 10a and a second focusing lens 11. A photo-sensitive material is scanned over the scanning area 12 by moving the photo-sensitive material while the above-mentioned three deflection elements 2, 7 and 8 diffract the scanning light beam according to the picture signals, thereby recording a halftone picture on the photo-sensitive material.

More specifically, the first and second vertical deflection elements 2 and 7 are positioned at conjugate points of the relay lens 5 and the deflection elements 2 and 7 are so controlled that their deflection angles are always the same, with the result that the light beam through the second deflection element 7 moves along the optical axis of the light beam 1 no matter how widely it is deflected between the two vertical deflection elements 2 and 7.

The light beam is flattened by the cylindrical lens 3 and the lenticular lens 4, and the flattened light beam passes through the aperture 6a of the aperture plate 6 adjacent to the relay lens 5. The width of the flattened light beam deflected by the vertical deflection elements 2 and 7 is varied according to the deflection angle. The aperture 6a is composed of a combination of three triangles; one of them constituting an upper portion thereof used to provide a beam of variable width as exemplified by the position indicated by arrow $K_2$ in FIG. 2; the lower two triangles, and the masking triangle between them are used to provide a beam with an intercepted portion as exemplified by the position indicated by arrow $K_1$ in FIG. 2. The upper and lower portions are thus complementary in function.

The center of the light beam passes through the second deflection element 7 and is shifted in the horizontal direction perpendicular to the optical axis by the horizontal deflection element 8 according to the screen angle desired. The light beam then passes through the first focusing lens 9, the aperture 10a of the masking means 10, and the second focusing lens 11, and is projected onto the photo-sensitive material.

This method is quite efficient, but it does have disadvantages. For example, the aperture 6a of the aperture plate 6 is rather complicated, the controlling of the deflection elements is also complicated, and a memory having a large storage capacity for the complicated control programs is required.

SUMMARY OF THE INVENTION

Therefore, it is an object of the present invention to provide a device for reproducing a halftone picture by scanning, free from the aforementioned disadvantages, which has a simple construction and is readily controllable.

According to the present invention a device is provided for reproducing a halftone picture by scanning, wherein a recording light beam to be projected on a photo-sensitive material is suitably controlled by means of picture signals obtained from the scanning of an original picture, comprising: a light source for the recording light beam; a first deflection element adapted to deflect the light beam selectively; a second deflection element adapted to deflect the light beam selectively in the direction of the width of the light beam; an aperture plate arranged between the first and second deflection elements and adapted to change the width of the light beam passing therethrough; an optical system for focusing the light beam from the second deflection element onto the photo-sensitive material; and control means for controlling deflection angles at the first and the second deflection elements so as to change the width of the light beam and to shift the center of the light beam in accordance with the picture signals.

DETAILED DESCRIPTION OF THE INVENTION

In order that the present invention may be better understood, preferred embodiments will now be described with reference to the accompanying drawings, which are given for the purposes of illustration only, and thus are not intended to be limitative of the present invention, and wherein:

FIG. 1 is a schematic view of a conventional device for reproducing a halftone picture by scanning;

FIG. 2 is a schematic view of halftone dots along a scanning line of the conventional device of FIG. 1;

Figure 3:
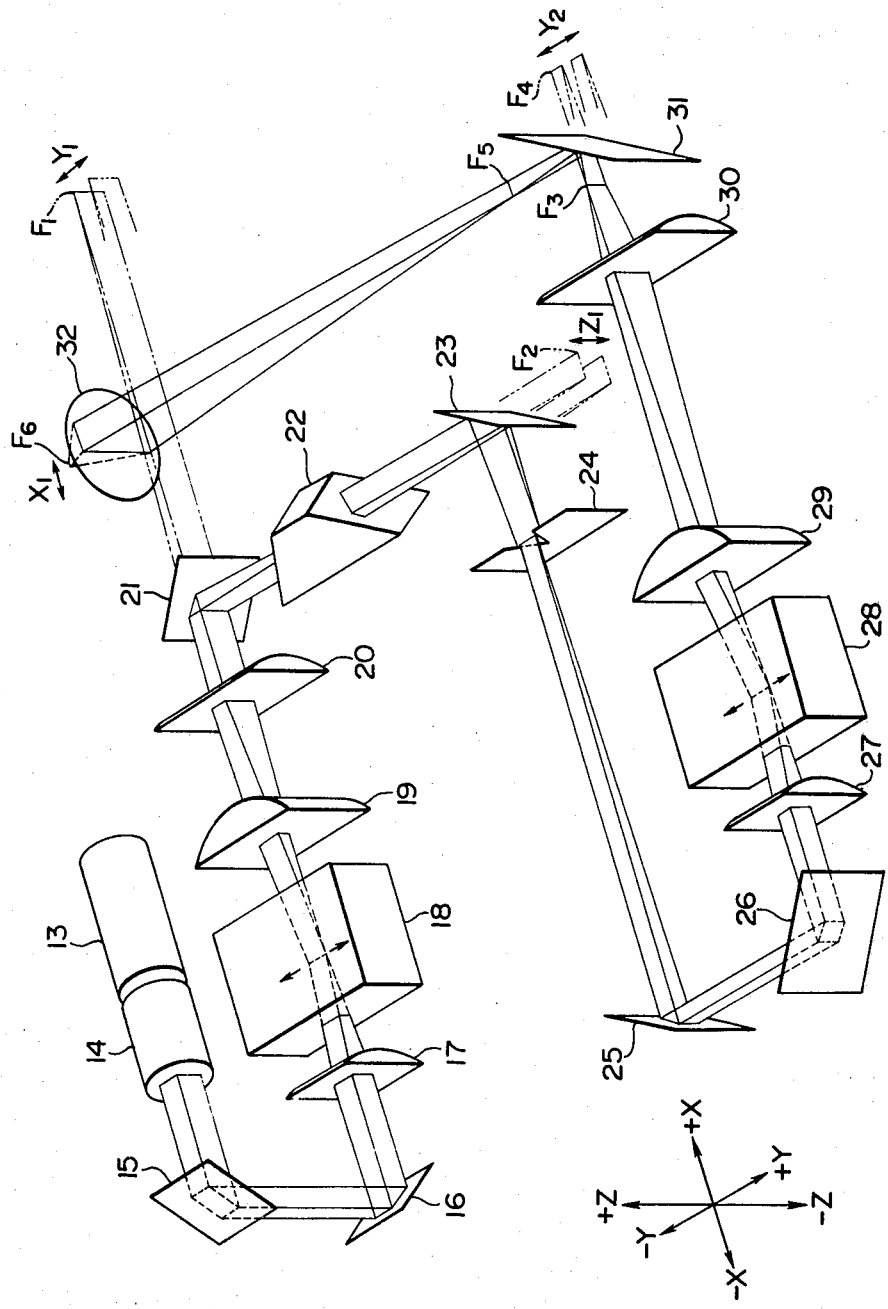
FIG. 3 is a schematic view of an optical system of a device according to the present invention.
Figure 4:
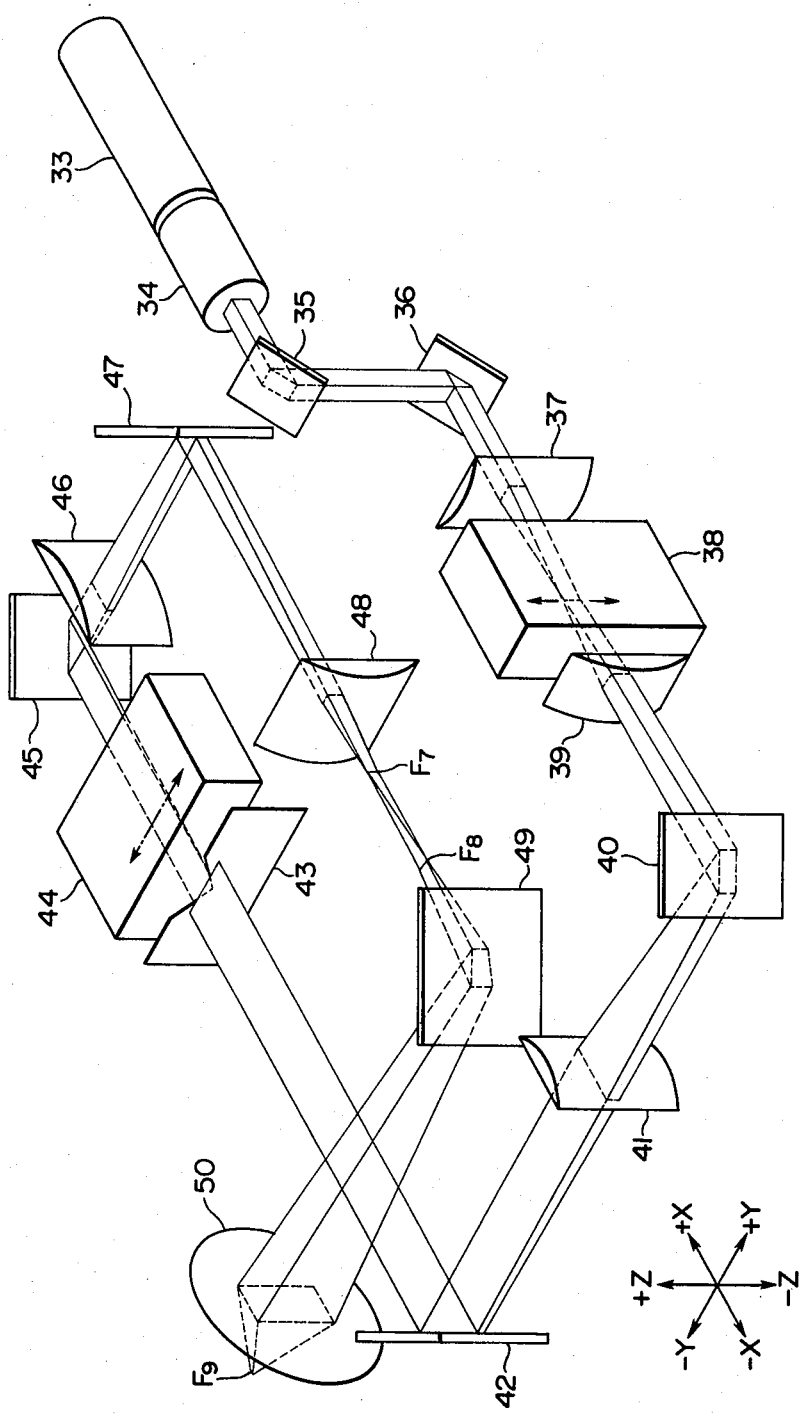
FIG. 4 is a schematic view of the optical system of another device according to the present invention.
Figure 9:
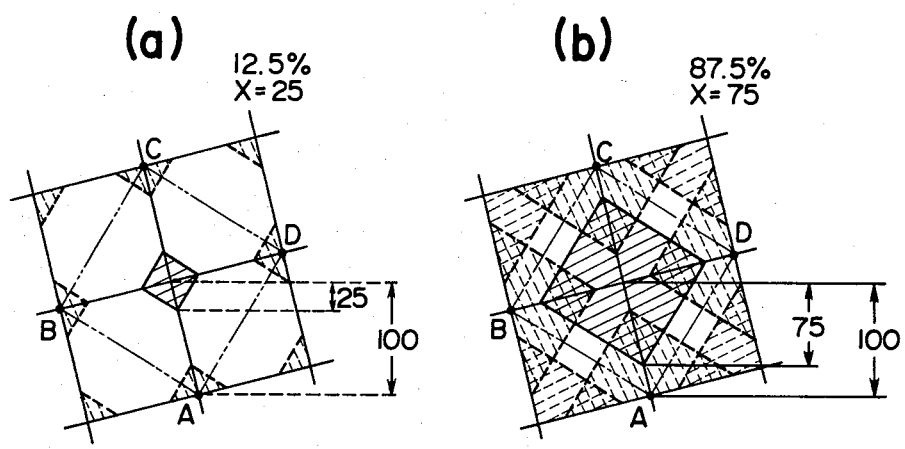
Figure 10:
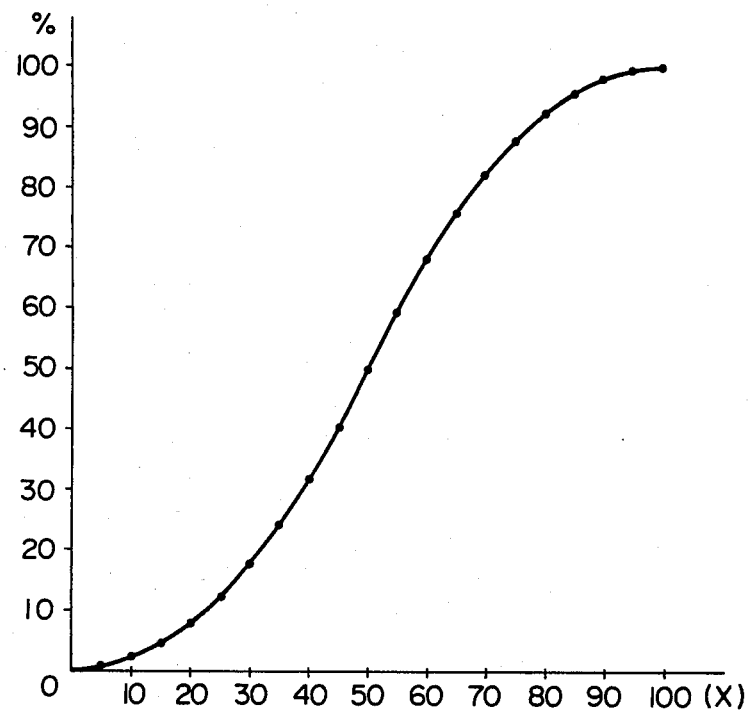

FIG. 9, including a and b, is a schematic view of dot units with dot areas of 12.5% and 87.5%, for explaining the relationship between the dot units and the addresses;

FIG. 10 shows schematically the relationship between the variable X and a dot area for addresses corresponding to the dot area;

FIG. 11 is a schematic view of a path of the center of the light beam for recording a dot;

FIG. 12 is a schematic view of paths of the center of the light beam for recording dots of various dot areas;

FIG. 13 is a block diagram of a control circuit for controlling the width of the light beam and the position of the center of the light beam for recording halftone dots; and FIG. 14, including a-d, is a schematic view of other embodiments of the aperture used in the optical systems of FIGS. 3 and 4.

FIGS. 3 and 4 illustrate preferred embodiments of an optical system of a device for reproducing a halftone picture by scanning according to the present invention, in which the X-, Y-, Z-axes shown will be referred to, for simplicity of explanation of optical axis directions, and vertical and horizontal deflection directions of the light beam.

In FIG. 3, a laser beam generated by a laser 13 is controlled by a beam expander 14 to obtain a light beam of the desired diameter. The light beam is reflected to the −Z direction by a mirror 15 and then to the X direction by a mirror 16, and is incident to a first deflection element 18 through a convex cylindrical lens 17 which converges the light beam in the Y direction on the first deflection element 18. The first deflection element 18 which is utilized for refracting or diffracting the light beam at a desired angle, may be a conventional one. In one embodiment of the present invention, an acoustic-optical deflector utilizing an ultrasonic oscillator is employed for such a purpose. This deflector, as is already well-known, is of a type which makes use of the fact that elastic deformation in a crystal caused by ultrasonic waves can function as a diffraction grating. This deflector is capable of suitably changing the pitch of the diffraction grating by controlling the frequency of the ultrasonic waves supplied to the crystal, so as to deflect the light beam at an adjustable diffraction angle. The deflector is capable of oscillating at deflection frequencies as high as $10^5$ to $10^6$ Hz, and of controlling the amplitude of deflection angle as desired.

The light beam incident on the first deflection element 18 is diffracted horizontaly, i.e. in the Y direction, at a desired angle depending on the ultrasonic frequency supplied to the first deflection element 18.

The light beam diverges in the Z direction, but its width in the Y direction is converged by a convex cylindrical lens 19 and its height in the Z direction is then converged by a convex cylindrical lens 20 so as to be parallel.

Consequently, if the light beam were to continue in a straight line, it would be focused on a line $F_1$ which is moved in the Y direction, as indicated by an arrow $Y_1$, depending on the diffraction angle varied by the first deflection element 18, as shown by two dotted lines.

In fact, however, the light beam is reflected to the Y direction by a mirror 21 and is then rotated through 90° by a dove prism 22. Then, if the light beam to continue in a straight line, it would be focused on a line $F_2$ which is moved in the Z direction, as indicated by an arrow $Z_1$, depending on the diffraction angle, as shown by two dotted lines.

The light beam is, in fact, reflected by a mirror 23 to the −X direction and is passed through a V-shaped aperture of an aperture plate 24, at which the light beam is focused. The width of the beam in the Y direction, cut off by the aperture plate 24, depends on the incident position on the V-shaped aperture which in turn depends on the deflection angle of the first deflection element 18.

The light beam through the V-shaped aperture, which diverges in the Z direction, is diverted by two mirrors 25 and 26 to the X direction and is focused on the second deflection element 28 by a convex cylindrical lens 27.

The second deflection element 28 has the same configuration and functions in the same manner as the first deflection element 18 described above. The light beam is diffracted horizontally again, i.e. in the Y direction, at a desired angle depending on the ultrasonic frequency supplied to the second deflection element 28.

The light beam diverges in the Z direction, but it is converged in the Y direction to a line $F_3$ and its height in the Z direction is then focused on a line $F_5$ via a mirror 31 by a convex cylindrical lens 30. A supposed focusing line $F_4$ which is moved in the Y direction, as indicated an arrow $Y_2$, depending on the diffraction angle of the second deflection element 28, is shown in FIG. 3 by two-dotted lines.

The light beam through the focusing line $F_5$, which converges in the X and Z directions, is finally focused on a line $F_6$ for scanning a recording material by a relay lens 32. The line $F_6$ is moved in the X direction, as shown by an arrow $X_1$, depending on the diffraction angle of the second deflection element 28. The width of the line in the X direction is varied depending on the diffraction angle of the first deflection element 18.

From the above description it will be readily understood that, while the recording material is moved in the Z direction, the light beam is diffracted periodically at the desired angles by the first and the second deflection elements 18 and 28, thereby obtaining a halftone picture on the recording material.

FIG. 4 illustrates another embodiment of the optical system of the device of the present invention, which has basically the same construction as the one shown in FIG. 3 except that the first and second deflection elements are arranged so as to diffract in directions at right angles to each other without using a dove prism (90° reflection prism as a reversion prism).

A laser light beam is generated by a laser 33 and its diameter is controlled suitably by a beam expander 34. The light beam obtained is reflected twice by mirrors 35 and 36 and its width in the Y direction is focused on a first deflection element 38 by a convex cylindrical lens 37. The first deflection element 38 diffracts the light beam vertically, i.e. in the Z direction, at a desired angle depending on the ultrasonic frequency supplied to the first deflection element 38.

The height of the light beam in the Z direction through the first deflection element 38 is converged on an aperture plate 43 having a V-shaped aperture via a mirror 40, a convex cylindrical lens 41, and a mirror 42 by a convex cylindrical lens 39. The width in the X direction of the light beam reflected by the mirror 40 is converged by the convex cylindrical lens 41 so as to be parallel. When the light beam passes through the V-shaped aperture, the width in the Y direction of the light beam is varied by the aperture plate 43 by controlling the first deflection element 38 in the Z direction, as described above.

The light beam passing through the V-shaped aperture, which diverges in the Z direction, is incident to a second deflection element 44. The second deflection element 44 diffracts the light beam horizontaly, i.e. in the X direction in the same manner as the first one described above.

The light beam passing through the second deflection element 44 is reflected by a mirror 45 and in the X direction it is focused on a line $F_7$ via a mirror 47 and a convex cylindrical lens 48 which focuses the height of the light beam in the Z direction on a line $F_8$. The focusing line $F_8$ is moved in the Y direction corresponding to the diffraction angle of the second deflection element 44 and its width in the Y direction is varied corresponding to the diffraction angle of the first deflection element 38.

The light beam diverging in both width and height is reflected by a mirror 49 and is finally focused on a line $F_9$ for scanning a recording material by a relay lens 50, thereby obtaining a halftone picture on the recording material in the same manner as described above.

In order to vary the width of the light beam passing through the V-shaped aperture of the optical system illustrated in FIGS. 3 and 4, said light beam is moved up and down, i.e. in the Z direction, by the first deflection element, the light beam passing through the second deflection element moves up and down accordingly. However, the desired diffraction operation can be effected and there is no practical problem as the light beam passes through the effective functional area of the crystal of the acoustic-optical deflector used.

In the system of FIG. 3, particularly, the light beam diverging from the aperture plate 24 is focused on the second deflection element 28 by the convex cylindrical lens 27, and the light path from the aperture plate 24 to the convex cylindrical lens 27 is substantially longer than that from the convex cylindrical lens 27 to the focusing point of the second deflection element 28. Therefore, the deviation in the Z direction of the light beam in the second deflection element 28 is quite small and thus may be neglected.

Furthermore, the light beam finally impinging on the recording material is moved in the Z direction, depending on the diffraction angle of the first deflection element, but the light path from the focusing line $F_5$ or $F_8$ to the relay lens 32 or 50 is far longer than that from the relay lens 32 or 50 to the final focusing line $F_6$ or $F_9$. Accordingly, it may also be neglected.

One control method for reproducing halftone dots having a screen angle according to the present invention will now be described with reference to FIGS. 5 to 13.

According to the present invention halftone dots having a screen angle $\theta$ can be obtained for any $\tan^{-1} \theta$ = integer. For brevity of explanation, the screen angle is chosen so as to satisfy the following formula, as shown in the drawings:

$$\tan \theta = \tfrac{1}{4} \ (\theta \approx 14.02°)$$

Figure 5:
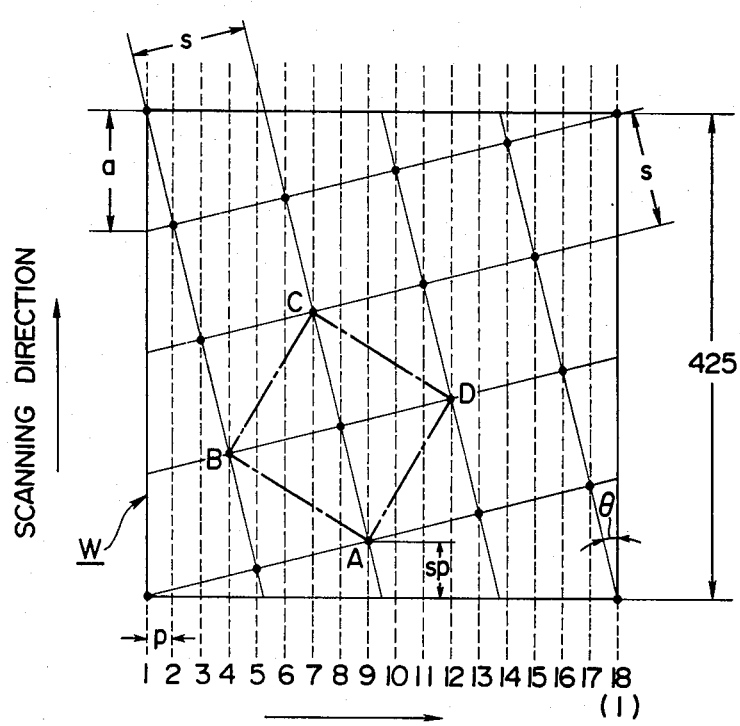
FIG. 5 is a schematic view of a dot block recorded by a device according to the present invention.
Figure 6:
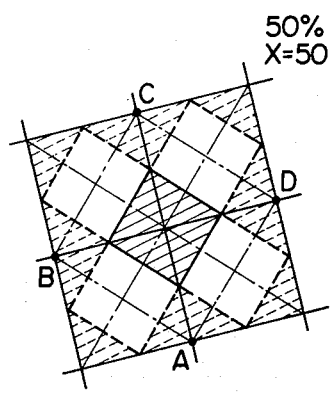
FIG. 6 is a schematic view of a dot unit with a dot area of 50%, recorded by a device according to the present invention.

In this case, as clearly shown in FIG. 5, assuming that the dot pitch s and scanning pitch P satisfy the following formula:

$$s = 4P/\cos\theta,$$

a dot block W in the form of a square having sides of $17 \times P$, which means a minimum repeating memory unit, includes 17 dot units one of which is shown in FIG. 5 by the one-dotted square ABCD for recording a 100% of dot area. The centers of such dot units are arranged at the intersections of the longitudinal and the transverse screen lines. Hence when a halftone picture having a dot area of more than 50% is reproduced, the dots are partly overlapped or completely so when the dot area is 100%. The longitudinal side of the dot block W is substantially divided into 425 addresses, as hereinafter described. The starting points sp of the dot units, as exemplified by A of the dot unit ABCD, depending on the screen angle desired, are stored in advance in memories. In FIG. 6 is shown a dot unit ABCD for dot having a dot area of 50%.

When a halftone picture is reproduced by the optical system shown in FIG. 3 or 4, the width and the central position of the light beam for scanning a recording material are adjusted by controlling the ultrasonic wave frequencies supplied to the first and the second deflection elements. The data for this purpose for each screen angle, corresponding to the variations of the light beam conditions, is stored in the memories beforehand, and are read out during scanning in order to control the two deflection elements. The data for reproducing a dot of 100% of dot area is stored in the memory and thus dots of less than 100% dot area are reproduced by controlling the read out addresses and timings.

Such a method will be is described with reference to FIGS. 7 to 12.

Figure 7:
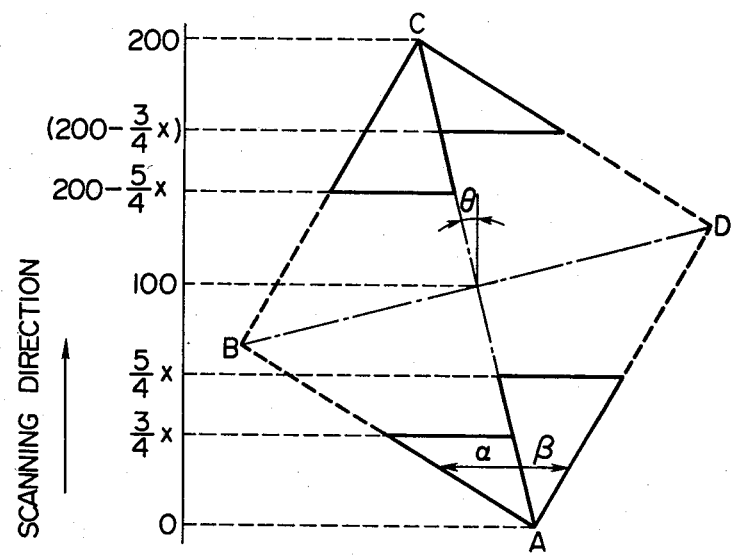
FIG. 7 is a schematic view of a dot unit with a dot area of 100%, for explaining the relationships between the scanning direction and addresses, and addresses and signals read out from the memories.

In FIG. 7 is shown a dot unit ABCD for a dot area of 100%, in which a diagonal AC is inclined at a screen angle $\theta$ ($\tan \theta = \tfrac{1}{4}$) from the scanning direction.

The widths of the two triangles ABC and ACD, perpendicular to the scanning direction, are assumed to be $\alpha$ and $\beta$ respectively, and are stored in corresponding addresses in the memories. However, the actual stored values are not proportional to the widths shown in FIG. 7, but are the values to be supplied to the first deflection element to control the width of the light beam through the V-shaped aperture of the aperture plate, so that the width of the light beam finally obtained may be proportional to the width value $\alpha + \uparrow$.

In FIG. 7, the starting point A and the point C are addressed by 0 and 200, respectively, and thus 60 increases from A, address 0, to B, address 75, and decreases from B to C, address 200, and on the other hand, $\beta$ increases from A, address 0, to D, address 125, and decreases D to C, address 200.

When the dot area of 100% is recorded, the stored data for $\alpha$ and $\beta$, for addresses from 0 to 200 are read out entirely to control the deflection element. When a dot area of less than 100% is recorded, as shown in FIG. 7 by solid lines, the data corresponding to the dot area is read out and the timing is adjusted. Then both ranges read out are connected, as shown in FIG. 8, thereby obtaining the dot EFGH having the desired dot area, as follows.

In order to read selectively the necessary ranges of addresses between 0 and 200 depending on the desired dot area, since the screen angle $\theta$ satisfies the formula: $\tan \theta = \tfrac{1}{4}$, as shown in FIG. 7, the addresses read out for $\alpha$ are in the ranges of (0–3X/4) and (200–5X/4) and those for $\beta$ are in the ranges of (0–5X/4) and (200–3X/4). The variable X is determined by the dot area desired, as hereinafter described.

When the dot area is 50%, i.e. X equals 50, the address ranges read out of $\alpha$ are (0–37.5) and (137.5–200), and those of $\beta$ are (0–62.5) and (162.5–200). However, since the addresses are integers, the fractions are omitted, thereby obtaining the address ranges (0–37), (137–200), (2–62), and (162–200). In this case, errors based on such omissions may be neglected.

Figure 8:
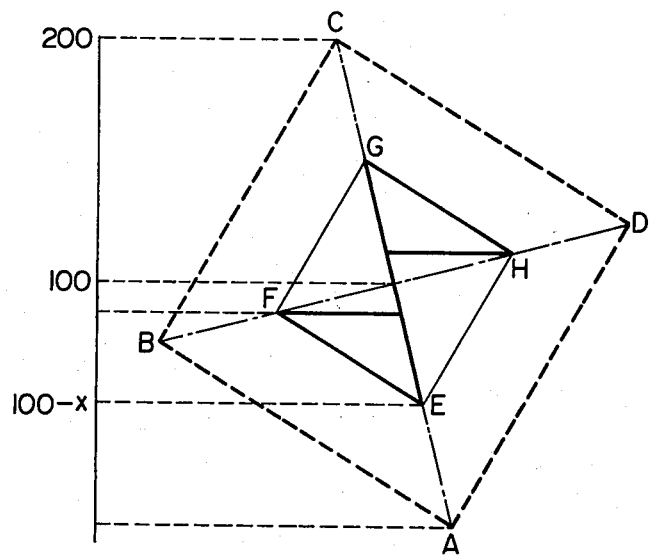
FIG. 8 is a schematic view of a dot unit with a dot area of 50%, for explaining the relationship between addresses and signals read out from the memories.

The read out timing of the address 0 is delayed by 100−X, i.e. 50, and the second part values are read out immediately after the first part values, as shown in FIG. 8, thereby obtaining a dot EFGH having the desired dot area.

The variable X is not the same as the value of the dot area except at values of 0, 50 and 100%. For instance, as shown in FIGS. 9 a and b, when X is 25, the dot area is 12.5% and when X is 75, the dot area is 87.5%. The relation between the variable X and the dot area is indicated in FIG. 10.

In order to obtain a halftone picture having a screen angle $\theta$, the center of the light beam has to be shifted suitably in a direction perpendicular to the scanning direction.

In FIG. 11 is shown a path Q of the center of the light beam in the dot EFGH, in which the path Q is turned at points M and N for which the addresses correspond to those of the points F and H. The amount of shift of the center of the width $\alpha+\beta$ is $[1+(\alpha-\beta)/2]$, wherein l is the distance between the diagonal EG and a line R which passes through the point E and is parallel to the scanning direction. This formula for the shifting amount of the center of the width $\alpha+\beta$ is satisfied for any dot size. The paths for dots of different dot areas are shown in FIG. 12; $Q_0$ for the dot $E_0F_0G_0H_0$ of 100% dot area, $Q_1$ for the dot $E_1F_1G_1H_1$ of 87.5% dot area, $Q_2$ for the dot $E_2F_2G_2H_2$ of 50% dot area, and $Q_3$ for the dot $E_3F_3G_3H_3$ of 12,5% dot area, In FIG. 13 is shown a control circuit for controlling the width and the central position of the light beam for reproducing a halftone picture having a screen angle $\theta$ (tan $\theta=\frac{1}{4}$) by the optical system shown in FIG. 3 or 4.

A pulse generator 51 generates a train of clock pulses which divide one scanning period into equal parts, and further generates one one-cycle pulse per one scanning period in phase with one of the clock pulses and in synchronisation with the rotation of the recording cylinder of the present invention. The pitch of the clock pulse is so determined that the number of the clock pulses per dot unit is the same as the address range of the memories, i.e. 200 clock pulses per one dot unit.

A line counter 52 receiving the clock pulses from the pulse generator 51 counts them and controls a memory 53 in which the starting points sp of the 17 dot units included in the dot block W are stored as follows, as shown in FIG. 5:

| Scanning line | sp value | Scanning line | sp value |
|---|---|---|---|
| 1 | 0 | 10 | 375 |
| 2 | 325 | 11 | 275 |
| 3 | 225 | 12 | 175 |
| 4 | 125 | 13 | 75 |
| 5 | 25 | 14 | 400 |
| 6 | 350 | 15 | 300 |
| 7 | 250 | 16 | 200 |
| 8 | 150 | 17 | 100 |
| 9 | 50 | | |

The one-cycle pulses from the pulse generator 51 are sent to a scan counter 54 and a dot block counter 56. The scan counter 54 counts the number of the one-cycle pulses received and outputs signals to an identity circuit 55 in which the sp values stored in the memory 53 are selected and from which timing signals for addressing the starting points per each scanning line of the dot units of the first dot block are output to the dot block counter 56 and an OR circuit 57. The dot block counter 56 is cleared by the one-cycle pulse and is started by the timing signal from the identity circuit 55 to count repeatedly 425 addresses corresponding to one dot block pitch, thereby outputting a signal per 425 addresses to the OR circuit 57.

In other words, the starting points sp in the scanning lines of the first dot block are addressed by the output signals from the identity circuit 55 and those of the following dot blocks are addressed by the output signals generated per the dot block pitch from the dot block counter 56. Hence, all starting points sp of the dot blocks can be addressed by feeding the output signals from the identity circuit 55 and the dot block counter 56 to the OR circuit 57.

A-point signals output from the OR circuit 57 are sent to a dot selection counter 58 and a slope counter 60 in order to start counting thereof. The dot selection downward counter 58 counts from 100 to 0 and outputs the values counted to an identity circuit 59 where the values counted are compared with a variable X explained below. The slope counter counts from 0 to 200 and outputs the counted values to a memory 61 as address signals.

Meanwhile, the original picture is scanned by phtoelectric means to obtain picture reproduction density signals (not shown) which are sampled by pulses having a pitch corresponding to the dot block pitch described above to obtain picture density values. The picture density values are converted into their dot areas by an operation circuit (not shown), and are then converted to the variable X values using the graph shown in FIG. 10.

The thus obtained variable X is supplied to a X-buffer register 62, and thence sent to calculators 63, 64 and 65 and the identity circuit 59 in which it is compared with the counted values from the dot selection counter 58. The calculaters 63, 64 and 65 calculate y=3X/4, y=200−5X/4, and y=5X/4, respectively.

Since the dot selection downward counter 58 counts from 100 to 0, as described above, the matching output signals from the identity circuit 59 are addressing signals for the point E (E-point signals) in FIG. 8. The E-point signals are fed to counters 66 and 67 to start them.

The values from the counters 66 and 67 are sent to a memory 72 storing the data of $\alpha$ and a memory 73 storing the data of $\beta$ via a selector 71. Hence the data stored is read out continuously from the memory 72 for the addresses 0 to 3X/4 and (200−5X/4) to 200 and from the memory 73 for the addresses 0 to 5X/4 and (200−3X/4) to 200, respectively, by controlling the counters 66 and 67. In this case, the addresses for the second part $\beta$ may be the same values as those for $\alpha$.

Such controls of the counters 66 and 67 are performed by identity circuits 68 and 70, a gate 69, and the selector 71.

The output 3X/4 from the calculator 63 and the counted value from the counter 66 are fed to the identitly circuit 68, and when both the output values coincide, a trigger signal for the gate 69 is output from the identity circuits 68. Gate 69 then sets the output (200−5X/4) from the calculator 64 to the counter 66. The counter 66 counts from this value to 200.

The counter 66 sends the counted values as the address signals to the memory 72, as described above. Thus, the addresses 0 to 3X/4 and (200-5X/4) to 200 are supplied consecutively to the memory 72, and the reading is performed from the point E in FIG. 8, thereby reading the value for α corresponding to the triangle EFG in FIG. 8.

The output 5X/4 from the calculator 65 and the counted value from the counter 67 are fed to the identity circuit 70, and when both the output values coincide, a trigger signal c for the selector 71 is couput from the identity citcuit 70.

The selector 71 changes the counted values a and b to be supplied to the memory 73 from the counter 66 and the counter 67, and supplies the value b until the trigger signal c is supplied, and thereafter the value a. Accordingly, the addresses 0 to 5X/4 are supplied to the memory 73 from the counter 67 and the addresses (200-3X/4) to 200 which are the same addresses for the memory 72, are supplied successively to the memory 73 from the counter 66. The reading is performed from the point E in FIG. 8, thereby reading the value for β corresponding to the triangle EGH in FIG. 8.

The output data from the memories 72 and 73 is sent to an adder 74 and a calculator 75. The adder adds both the output data and output signals for the width $\alpha+\beta$, which is supplied to the first deflection element. The calculator 75 calculates $(\alpha-\beta)/2$ from both output data values and sends the value $(\alpha-\beta)/2$ to an adder 76.

The slope counter 60 counts to 200 from the starting point sp and its counted value is supplied to a memory 61 as a read address. In the memory 61 the value l depending on a screen angle shown in FIG. 11 is stored and is read by the addressing signal from the slope counter 60. The value l read is sent to the adder 76 and is added to the output value $(\alpha-\beta)/2$ from the calculator 75 to output the value $l+(\alpha-\beta)/2$ for shifting the central position of the width $\alpha+\beta$, which is to be supplied to the second deflection element.

The thus obtained values $\alpha+\beta$ and $[l+(\alpha-\beta)/2]$ from the control circuit of FIG. 13 are supplied to the first and the second deflection elements of FIG. 3 of 4, thereby obtaining a halftone picture having a screen angle $\theta(\tan\theta=\frac{1}{4})$.

The preferred embodiment of the present invention has been described for a screen angle $\theta$ satisfying $\tan\theta=\frac{1}{4}$. However, it will be readiy understood by those skilled in the art that another screen angle may be used. In this case, the data stored in the memories 53, 61, 72 and 73, and the formulae of the calculators 63, 64 and 65 in FIG. 13 are replaced suitably according to the new screen angle. If the screen angle $\theta$ is selected so that the value of $\tan^{-1}\theta$ is a small integer, the data stored in the memories and so on is simplified, which is more convenient and practical.

Although the invention has been shown and described with respect to preferred embodiments thereof, it should be understood that various changes and modifications could be made therein without departing from the scope of the invention, and therefore it is not intended that the description of the embodiments given above should limit the scope of protection sought.

For instance, the light beam may be directed along a straight line without using any mirrors, or the V-shaped aperture of the aperture plate used in the embodiment described above may be changed to any of those shown in FIGS. 14 a, b, c, and d.

What is claimed is:

1. A device for reproducing a halftone picture by scanning, wherein a recording light beam to be projected on a photo-sensitive material is suitably controlled by means of picture signals obtained from the scanning of an original picture, comprising:
   a light source for the recording light beam;
   a first deflection element adapted to deflect the light beam selectively in a certain direction;
   a second deflection element adapted to deflect the light beam selectively in a direction orthogonal to the deflecting angle of the first deflection element;
   an aperture plate arranged between the first and second deflection elements and having a width which is reduced along the direction of the deflection of the first deflection element;
   an anamorphic optical system arranged between the first deflection element and the aperture plate and adapted to flatten the beam so as to reduce its cross sectional dimension orthogonal to the direction in which it is deflected by the second deflection element;
   an optical system for focusing the light beam from the second deflection element onto the photosensitive material; and
   control means for controlling deflection angles at the first and second deflection elements so as to change the width of the light beam in cooperation with said aperture plate and to shift the center of the light beam so as to allow it to be in the center of each halftone dot, both in accordance with the picture signals.

2. A device according to claim 1, wherein the anamorphic optical system comprises a pair of convex cylindrical lenses aligned in directions orthogonal to each other.

3. A device according to claim 2, wherein the flattened light beam is focused on the aperture plate.

4. A device according to claims 1, 2 or 3, wherein the control means is adapted to allow the generation of a halftone dot pattern with a certain screen angle selectable from an infinite number of them, by generating whole dots along each scan line where it meets one of pitch lines of halftone dots.

5. In a device for producing halftone pictures by scanning, having an apparatus receiving a beam of light travelling in a first direction, means for producing complete halftone dots in a single scan having:
   (a) first focusing means for converging said light beam to a line in a second direction perpendicular to said first direction;
   (b) first deflecting means receiving said converging light beam for selectively deflecting the same in said second direction;
   (c) second focusing means receiving said deflected light beam for converging the same to a line in a third direction perpendicular to said first and second directions;
   (d) aperture plate means at the focus of said second focusing means for passing said light beam with a dimension in said third direction which is dependent on the deflection of said light beam in said second direction;
   (e) second deflecting means receiving said light beam after passage through said aperture plate means for selectively deflecting the same in said third direction;

(f) third focusing means receiving said twice deflected light beam for again converging the same to a line in said second direction;

(g) fourth focusing means for focusing said light beam to a further line in said third direction; and (h) relay focusing means for finally focusing said light beam to a scanning line in said third direction for scanning a recording material movable in said second direction;

(i) said scanning line being movable in said third direction according to deflection by said second deflecting means and having a length dimension in said third direction according to deflection by said first deflecting means.

6. The device recited in claim 5, further comprising fifth focusing means receiving said light beam after convergence by said second focusing means, for collimating said light beam and limiting spread of said light beam in said third direction.

7. The device recited in claim 5, further comprising rotating means for rotating said light beam and interchanging said second and third directions.

8. The device recited in claim 5, further comprising sixth focusing means between said aperture plate means and said second deflecting means, for further converging spread of said beam in said second direction and for again focusing said beam to a further line in said third direction.

9. The device recited in claim 5 wherein said second focusing means comprises an anamorphic optical system.

10. The device recited in claim 5 wherein each of said first, second, third and fourth focusing means comprises an anamorphic optical system.

11. The device recited in claim 5 wherein said aperture plate means comprises an opening for passing said light beam, the opening having a width dimension monotonically dependent upon deflection in the second direction.

* * * * *